United States Patent
Xu

(10) Patent No.: US 8,919,970 B2
(45) Date of Patent: Dec. 30, 2014

(54) ADJUSTABLE SUPPORTING MECHANISM AND PROJECTOR THEREWITH

(75) Inventor: ZhongWei Xu, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 176 days.

(21) Appl. No.: 13/610,767

(22) Filed: Sep. 11, 2012

(65) Prior Publication Data

US 2014/0009745 A1 Jan. 9, 2014

(30) Foreign Application Priority Data

Jul. 9, 2012 (CN) .......................... 2012 1 0237203

(51) Int. Cl.
*G03B 21/14* (2006.01)

(52) U.S. Cl.
USPC ........................................................ 353/119

(58) Field of Classification Search
CPC ... H04N 9/3141; H04N 9/3197; G03B 21/16; G03B 21/14; F16M 7/00; F16M 7/009
USPC ........................ 353/70, 119, 122; 349/5, 7–9; 248/188.4, 650
See application file for complete search history.

(56) References Cited

U.S. PATENT DOCUMENTS

| | | | |
|---|---|---|---|
| 6,302,543 B1 * | 10/2001 | Arai et al. | 353/70 |
| 6,461,002 B1 * | 10/2002 | Su | 353/119 |
| 7,017,220 B2 | 3/2006 | Alexander | |
| 7,744,050 B2 * | 6/2010 | de Toledo et al. | 248/188.3 |
| 2002/0140909 A1 * | 10/2002 | Tanaka | 353/70 |
| 2006/0043252 A1 * | 3/2006 | Lee | 248/354.6 |
| 2007/0257181 A1 * | 11/2007 | Dittmer et al. | 248/637 |
| 2007/0263180 A1 * | 11/2007 | Tsuboi | 353/119 |
| 2008/0168855 A1 * | 7/2008 | Giefer et al. | 74/412 R |
| 2009/0153810 A1 * | 6/2009 | Liu et al. | 353/119 |
| 2009/0278003 A1 * | 11/2009 | Chiang | 248/188.4 |

* cited by examiner

*Primary Examiner* — Sultan Chowdhury
(74) *Attorney, Agent, or Firm* — Winston Hsu; Scott Margo

(57) ABSTRACT

An adjustable supporting mechanism and a projector therewith are disclosed. The adjustable supporting mechanism is disposed in an apparatus casing includes a clamping part, an adjustment part, a constraining part, and a releasing part. The clamping part is fixedly disposed on the apparatus casing and has a passage extending in a direction. The adjustment part is disposed through the passage and is capable of protruding out of the apparatus casing. The constraining part is disposed to be capable of selectively urging the clamping part to clamp the adjustment part or being urged by the releasing part to release the clamping for releasing the adjustment part. Therefore, the exposed length of the adjustment part is adjustable, so that the disposition angle of the projector can be easily adjusted.

18 Claims, 4 Drawing Sheets

US 8,919,970 B2

ADJUSTABLE SUPPORTING MECHANISM AND PROJECTOR THEREWITH

BACKGROUND OF THE INVENTION

1. Field of the Invention

The invention relates to an adjustable supporting mechanism and a projector, and especially relates to an adjustable supporting mechanism for apparatus casing and a projector with height adjustable support.

2. Description of the Prior Art

Some current desktop electronic apparatuses such as projectors may need frequent adjustment of disposition angle by use demands. The projector is commonly equipped with rotatable feet which are engaged onto the bottom of the projector by use of thread structure. When the disposition angle of the projector (e.g. inclination angle relative to a desktop where the projector is disposed) needs to be adjusted, a user can rotate the feet to adjust the protrusive heights of the feet so as to perform the angle adjustment on the projector. In general, during the above rotating the feet, the apparatus casing has to be raised first or at least be lifted a little aslant. Then, the user can adjust the protrusive heights of the feet by feeling. Afterward, the user puts the apparatus casing back onto the desktop and judges whether the disposition angle of the projector meets the need. If not, the above adjustment is repeated. Such adjustment mechanism is obviously tedious and unreliable, which is very inconvenient to the user. Furthermore, after the above adjustment, if the user needs to drag the projector on the desktop by some reason, the dragging may unexpectedly rotate the feet to change the set supporting height, so that the user needs to perform the above adjustment again. It is also very inconvenient to the user.

SUMMARY OF THE INVENTION

An objective of the invention is to provide an adjustable supporting mechanism, installed in an apparatus casing. The adjustable supporting mechanism can adjust the length of a support exposed out of the apparatus casing for adjusting the disposition angle of the apparatus casing by an effect of linearly moving a single member to release the support.

An adjustable supporting mechanism of the invention is installed in an apparatus casing. The adjustable supporting mechanism includes a clamping part, an adjustment part, a constraining part, and a releasing part. The clamping part is fixedly disposed on the apparatus casing and has a passage. The passage extends in a first direction. The adjustment part is disposed through the passage and capable of protruding out of the apparatus casing. The constraining part includes a constraint ring and an elastic part. The constraint ring is sleeved on the clamping part. The elastic part is disposed against the constraint ring to urge the constraint ring to move in the first direction, so that the clamping part clamps the adjustment part. The releasing part is capable of moving relative to the clamping part and pushing the constraint ring to urge the constraint ring to move in a second direction opposite to the first direction, so that the clamping part releases the adjustment part. Thereby, a user can make the adjustment part free move relative to the apparatus casing just by moving the releasing part, so that the protrusive length of the adjustment part out of the apparatus casing can be easily adjusted. In practice, the user can lift the apparatus casing aslant from a desktop to a required disposition angle and operate the releasing part to release the adjustment part so that the adjustment part moves downward by its weight. The length of the adjustment part exposed out of the apparatus casing is exactly the required length for the required disposition angle. Afterward, the user leaves the releasing part. The constraining part automatically constrains the clamping part again to clamp the adjustment part. The support adjustment is therefore completed. It is obvious that the user can use the adjustable supporting mechanism of the invention to easily and quickly adjust the disposition angle of the apparatus casing.

Another objective of the invention is to provide a projector, which has the adjustable supporting mechanism of the invention. Thereby, the disposition angle of the projector can be adjusted through the adjustable supporting mechanism.

The projector of the invention includes an apparatus casing and an adjustable supporting mechanism. The apparatus casing includes a plurality of fixed feet and has a bottom surface. The fixed feet are disposed on the bottom surface. The adjustable supporting mechanism is disposed in the apparatus casing and includes a clamping part, an adjustment part, a constraining part, and a releasing part. The clamping part is fixedly disposed on the apparatus casing and has a passage. The passage extends in a first direction. The adjustment part is disposed through the passage and capable of extending and shrinking relative to the bottom surface of the apparatus casing. The constraining part includes a constraint ring and an elastic part. The constraint ring is sleeved on the clamping part. The elastic part is disposed against the constraint ring to urge the constraint ring to move in the first direction, so that the clamping part clamps the adjustment part. The releasing part is capable of moving relative to the clamping part and pushing the constraint ring to urge the constraint ring to move in a second direction opposite to the first direction, so that the clamping part releases the adjustment part.

Thereby, a user can make the adjustment part free move relative to the apparatus casing just by moving the releasing part, so that the protrusive length of the adjustment part out of the apparatus casing can be easily adjusted. That is, the disposition angle of the projector supported by the adjustment part and the fixed feet is adjusted. Similarly, in practice, the user can lift the apparatus casing aslant from a desktop to a required disposition angle and execute the above operation on the adjustable supporting mechanism to complete the adjustment of the disposition angle of the projector. It is obvious that the user can use the adjustable supporting mechanism of the invention to easily and quickly adjust the disposition angle of the projector.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
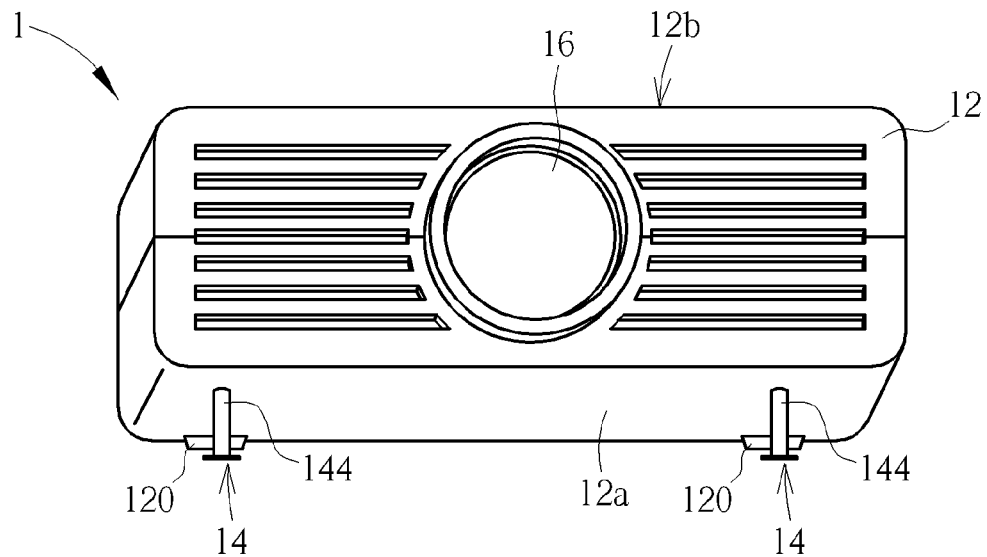
FIG. 1 is a schematic diagram illustrating a projector of a preferred embodiment according to the invention.

Please refer to FIG. 1, which is a schematic diagram illustrating a projector 1 of a preferred embodiment according to the invention. The projector 1 includes an apparatus casing 12 and two adjustable supporting mechanisms 14. The apparatus casing 12 has a bottom surface 12a and a top surface 12b opposite to the bottom surface 12a. The apparatus casing 12 includes two fixed feet 120 disposed on the bottom surface 12a. The adjustable supporting mechanisms 14 are disposed in the apparatus casing 12 and exposed out of the bottom surface 12a for together with the fixed feet 120 supporting the apparatus casing 12. For use, a user can adjust the disposition angle of the apparatus casing 12 by controlling the exposed lengths of the adjustable supporting mechanisms 14. In general, the adjustable supporting mechanism 14 is disposed at the front portion of the apparatus casing 12, i.e. near a projection lens 16; however, the invention is not limited thereto.

Figure 2:
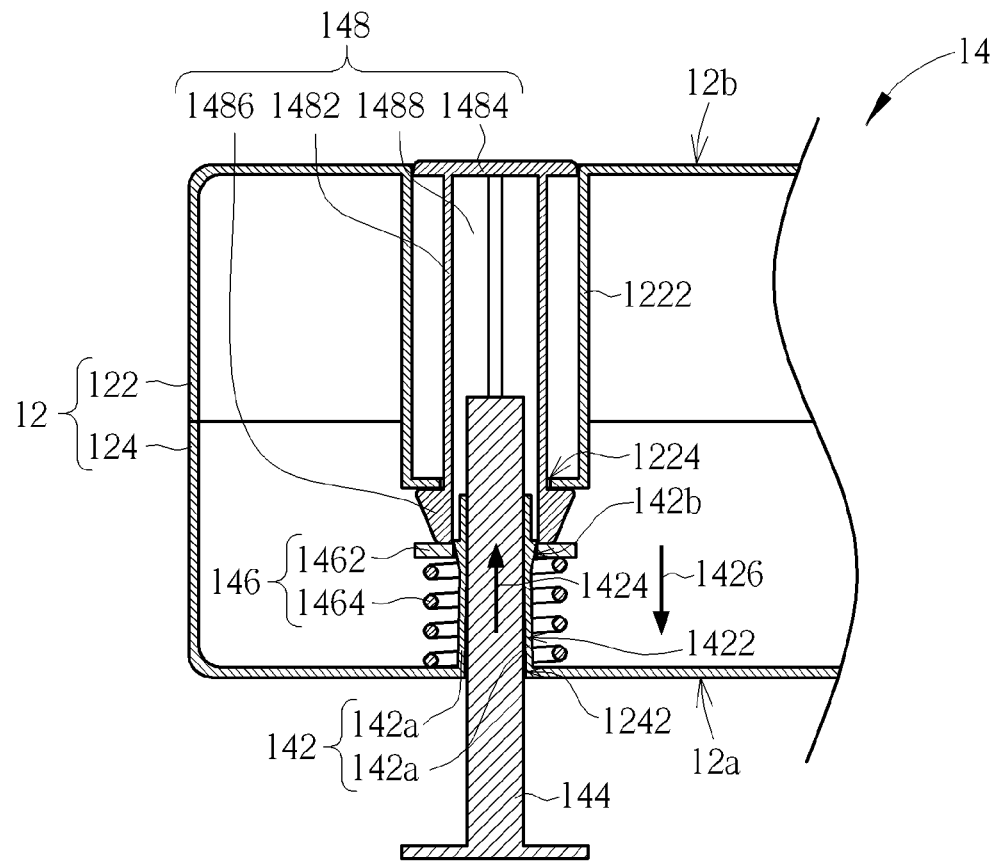
FIG. 2 is a sectional view of the left adjustable supporting mechanism of the projector in FIG. 1.
Figure 3:
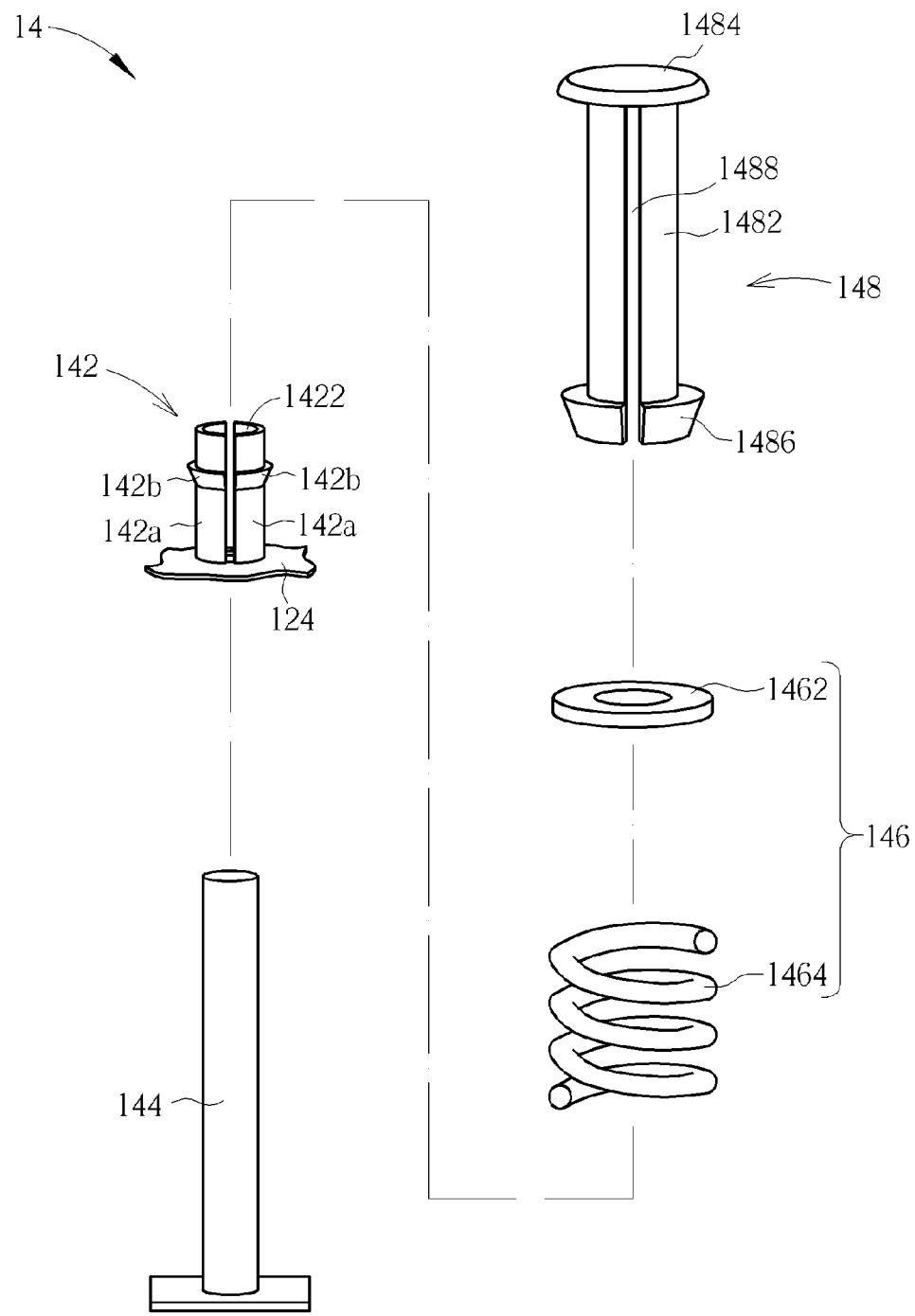
FIG. 3 is an exploded view of the adjustable supporting mechanism in FIG. 2.

Please also refer to FIG. 2 and FIG. 3. FIG. 2 is a sectional view of the left adjustable supporting mechanism 14 in FIG. 1. FIG. 3 is an exploded view of the adjustable supporting mechanism 14 in FIG. 2. In the embodiment, the left adjustable supporting mechanism 14 and the right adjustable supporting mechanism 14 are the same, so the description for the right adjustable supporting mechanism 14 will not be repeated. The adjustable supporting mechanism 14 includes a clamping part 142, an adjustment part 144, a constraining part 146, and a releasing part 148. The clamping part 142 is fixedly disposed on the apparatus casing 12 and has a first passage 1422. The first passage 1422 extends in a first direction 1424. The adjustment part 144 is disposed through the first passage 1422 and capable of extending and shrinking relative to the bottom surface 12a. The constraining part 146 includes a constraint ring 1462 and a first elastic part 1464. The constraint ring 1462 is sleeved on the clamping part 142. The first elastic part 1464 is disposed against the constraint ring 1462 to urge the constraint ring 1462 to move in a first direction 1424, so that the clamping part 142 clamps the adjustment part 144. The releasing part 148 is capable of moving relative to the clamping part 142 and pushing the constraint ring 1462 to urge the constraint ring 1462 to move in a second direction 1426 opposite to the first direction 1424, so that the clamping part 142 releases the adjustment part 144.

Further, in the embodiment, the apparatus casing 12 includes an upper casing 122 and a lower casing 124 connected to the upper casing 122. The upper casing 122 has the top surface 12b; the lower casing 124 has the bottom surface 12a. The clamping part 142 includes a pair of sidewalls 142a oppositely disposed on the lower casing 124 and forming the first passage 1422. The sidewalls 142a and the lower casing 124 can be formed in one piece, but the invention is not limited thereto. In practice, the sidewalls 142a can be formed by axially forming a slot through a tube. Because the open slot is formed between the sidewalls 142a, each of the sidewalls 142a forms a cantilever structure and has a taper surface 142b away from its fixed end. When the constraint ring 1462 moves relative to the sidewalls 142a, the constraint ring 1462 can push the sidewalls 142a by the taper surfaces 142b to make the sidewalls 142a approach each other for clamping the adjustment part 144. In another aspect, when the clamping part 142 is not pressed by the constraint ring 1462, the cross section of the first passage 1422 is larger than that of the adjustment part 144 so that the adjustment part 144 can free move relative to the clamping part 142. It is added that in the embodiment, the taper surface 142b is formed by a protrusive ring disposed on the sidewall 142a, but the invention is not limited thereto. For example, the outer surface of the sidewall 142a can have a taper as the above taper surface 142b, and the above protrusive ring is needless. In addition, in practice, the taper surface 142b can be formed only on one of the sidewalls 142a. The cross section of the first passage 1422 also can be shrunk for clamping the adjustment part 144 when the constraint ring 1462 slides on the taper surface 142b.

The lower casing 124 has a through hole 1242 at the bottom surface 12a. The through hole 1242 connects the first passage 1422. The adjustment part 144 passes through the through hole 1242 in the first direction 1424 from the bottom side of the apparatus casing 12 to be movably disposed in the first passage 1422. The constraint ring 1462 of the constraining part 146 is sleeved on the sidewalls 142a and between an inner wall of the lower casing 124 and the taper surface 142b. The first elastic part 1464 of the constraining part 146 is sleeved on the sidewalls 142a and pre-compressed between the constraint ring 1462 and the inner wall of the lower casing 124, so that the first elastic part 1464 can produce an enough resilient force to urge the constraint ring 1462 to push the sidewalls 142a through the taper surfaces 142b to make the sidewalls 142a approach each other to clamp the adjustment part 144. In practice, the above design of resilience needs consideration of the maximum force of static friction on the adjustment part 144 by the clamping part 142, the weight of the projector 1 and so on, which is well-known by people in the art and will not described in detail herein. It is added that in practice, an end of the adjustment part 144 extending into the apparatus casing 12 thereon forms a protrusive ring or block to be capable of being blocked by the free ends of the sidewalls 142a for preventing the adjustment part 144 from departing from the clamping part 142 or the apparatus casing 12, especially during an adjustment on the exposed length of the adjustment part 144 out of the apparatus casing 12. In addition, in practice, the first elastic part 1464 is a spring, but the invention is not limited thereto.

The releasing part 148 is inserted into the apparatus casing 12 from the upper casing 122 to be movably disposed above the constraining part 146. In the embodiment, the upper casing 122 has a recess structure 1222 on the top surface 12b and a through hole 1224 at the bottom of the recess structure 1222. The releasing part 148 is a rod part and includes a rod body 1482, a button portion 1484 at an end of the rod body 1482, and a retained portion 1486 at the other end of the rod body 1482. The rod body 1482 is disposed in the recess structure 1222. The button portion 1484 is exposed out of the top surface 12b to be capable of being pressed by the user. The retained portion 1486 is disposed through the through hole 1224 in the apparatus casing 12 for preventing the releasing part 148 from being departing from the apparatus casing 12. In the embodiment, the retained portion 1486 is also taken as a portion of the releasing part 148 for pressing the constraint ring 1462, so the releasing part 148 can use the retained portion 1486 to push the constraint ring 1462 in the second direction 1426 so that the clamping part 142 can release the adjustment part 144. It is added that in general, when the projector 1 is supported on a desk top, the releasing part 148 can keep contacting the constraint ring 1462 by its weight. In addition, in the embodiment, the releasing part 148 has a second passage 1488. The adjustment part 144 is also partially disposed in the second passage 1488, so the adjustment part 144 can have a longer length without structurally interfering with the releasing part 148. However, the invention is not limited thereto.

Figure 4:
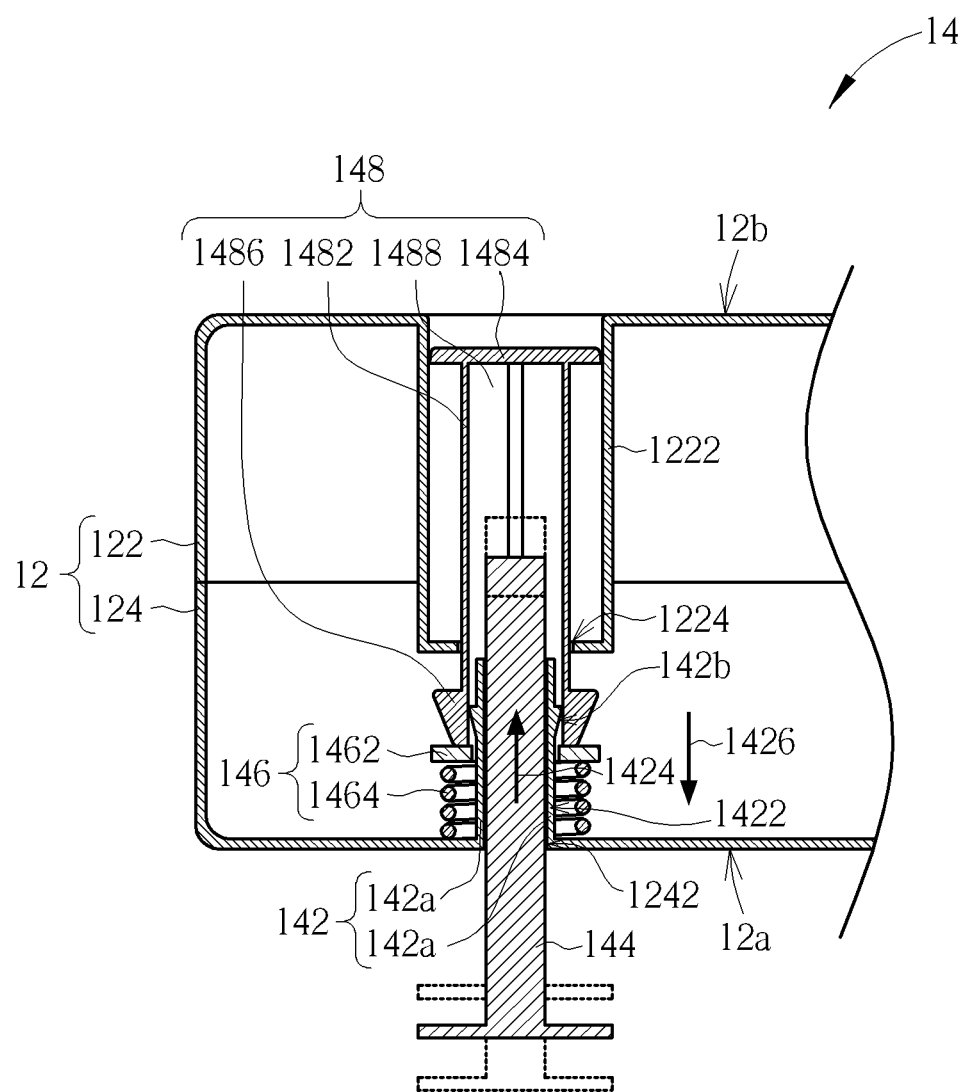
FIG. 4 is a sectional view of the adjustable supporting mechanism in FIG. 2 when a clamping part releases an adjustment part.

Please also refer to FIG. 4, which is a sectional view of the adjustable supporting mechanism 14 when the clamping part 142 releases the adjustment part 144. FIG. 2 and FIG. 4 can be regarded as schematic diagrams illustrating the action of the adjustable supporting mechanism 14. The user can press the button portion 1484 to make the releasing part 148 move downward in the second direction 1426. The space in the recess structure 1222 allows the button portion 1484 to free move therein. In the embodiment, the cross section of the recess structure 1222 is similar to the cross section of the button portion 1484, so the sidewall of the recess structure 1222 can provide structure support to the button portion 1484 to enhance the moving stability of the button portion 1484. The retained portion 1486, moving downward, pushes the constraint ring 1462 so that the constraint ring 1462 departs from the taper surface 142b and presses the first elastic part 1464. After the constraint ring 1462 departs from the taper surface 142b, the sidewalls 142a return to their free state; that is, the clamping part 142 releases the adjustment part 144. The length of the adjustment part 144 out of the apparatus casing 12 is now capable of being adjusted to be a required length.

Afterward, the user releases the button portion 1484. The resilient force produced by the compressed first elastic part 1464 will urge the constraint ring 1462 to move upward in the first direction 1424 and slide on the taper surfaces 142b, so as to press the sidewalls 142a of the clamping part 142 again so that the sidewalls 142a approach each other to clamp the adjustment part 144. The adjustment part 144 is therefore fixed again. The disposition angle of the projector 1 supported by the adjustment part 144 together with the fixed feet 120 is adjusted. At this moment, the adjustment operation of the disposition angle of the projector 1 has been completed. It is added that in the embodiment, the adjustment part 144 is disposed vertically, so the adjustment part 144 can move downward by its weight. In a practical operation, the user can lift the apparatus casing 12 aslant to the required disposition angle, press the button portion 1484 to release the adjustment part 144, and then make the adjustment part 144 move downward by its weight to contact the desktop, which achieves the purpose of adjusting the length of the adjustment part 144 quickly and in one time.

Figure 5:
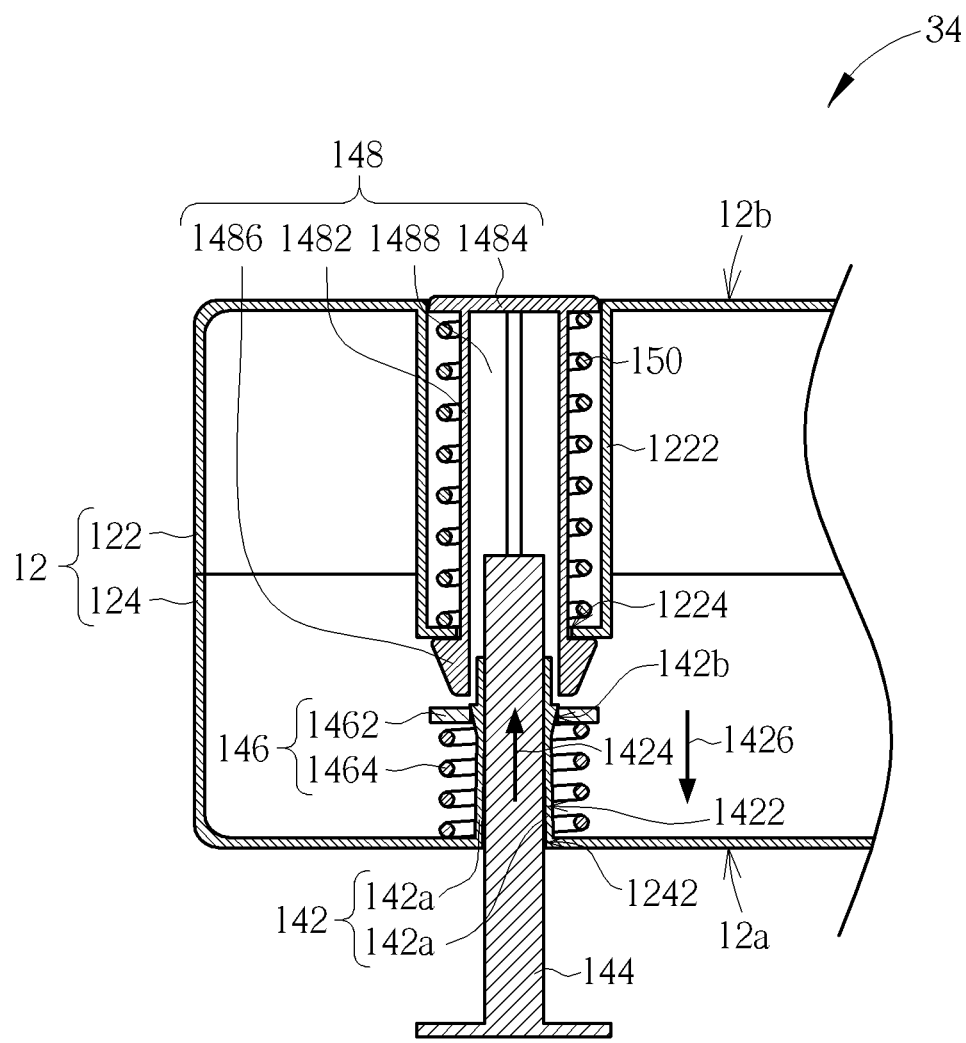
FIG. 5 is a sectional view of an adjustable supporting mechanism according to another embodiment.

Please refer to FIG. 5, which is a sectional view of an adjustable supporting mechanism 34 according to another embodiment. The adjustable supporting mechanism 34 is similar in structure to the adjustable supporting mechanism 14. The main difference therebetween is that the adjustable supporting mechanism 34 further includes a second elastic part 150 disposed against and between the button portion 1484 and the bottom of the recess structure 1222 for urging the releasing part 148 to move in the first direction 1424 until the retained portion 1486 is blocked at the through hole 1224. Therefore, the button portion 1484 can keep being exposed out of the top surface 12b of the upper casing 122. In the embodiment, when the releasing part 148 is not operated, a gap exists between the retained portion 1486 and the constraint ring 1462, which can avoid an unexpected adjustment of the adjustment part 144 due to the fact that when the releasing part 148 is shocked, the releasing part 148 may impact the constraint ring 1462 leading to a temporary release of the adjustment part 144. For other description of the adjustable supporting mechanism 34, please refer to the relevant descriptions of the adjustable supporting mechanism 14, which are not repeated herein.

As discussed above, the invention can make the adjustment part free move relative to the apparatus casing by just moving the releasing part. Thereby, the exposed length of the adjustment part extends out of the apparatus casing can be easily adjusted; that is, the disposition angle of the projector is therefore adjusted. In practice, a user can lift the apparatus casing aslant from the desk top to a required disposition angle. Then, the user can perform the above operation of the adjustable supporting mechanism for completing an adjustment of the disposition angle of the projector. Compared to the prior art, it is obvious that the user can easily and quickly adjust the disposition angle of the projector by use of the adjustable supporting mechanism of the invention. The adjustable supporting mechanism also provides stable and reliable supporting to the projector. Therefore, the invention efficiently solves the problem of inconvenient adjustment operation and insufficient stability of supporting structure of the projector in the prior art.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An adjustable supporting mechanism, installed in an apparatus casing, the adjustable supporting mechanism comprising:
   a clamping part fixedly disposed on the apparatus casing and having a first passage, the first passage extending in a first direction;
   an adjustment part disposed through the first passage and capable of protruding out of the apparatus casing;
   a constraining part comprising a constraint ring and a first elastic part, the constraint ring being sleeved on the clamping part, the first elastic part being disposed against the constraint ring to urge the constraint ring to move in the first direction, so that the clamping part clamps the adjustment part; and
   a releasing part capable of moving relative to the clamping part and pushing the constraint ring to urge the constraint ring to move in a second direction opposite to the first direction, so that the clamping part releases the adjustment part.

2. The adjustable supporting mechanism of claim 1, further comprising a second elastic part, disposed against the releasing part to urge the releasing part to move in the first direction.

3. The adjustable supporting mechanism of claim 1, wherein the clamping part comprises a pair of sidewalls, the sidewalls form the first passage, and the clamping part clamps the adjustment part by the sidewalls.

4. The adjustable supporting mechanism of claim 3, wherein one of the sidewalls has a taper surface, and the constraint ring slides on the taper surface so that the clamping part is capable of clamping the adjustment part.

5. The adjustable supporting mechanism of claim 4, wherein the releasing part has a button portion, exposed out of the apparatus casing.

6. The adjustable supporting mechanism of claim 5, the apparatus casing having a recess structure and a through hole formed at a bottom of the recess structure, wherein the releasing part is disposed in the recess structure and passes through the through hole, and the releasing part has a retained portion to prevent the releasing part from departing from the apparatus casing.

7. The adjustable supporting mechanism of claim 6, further comprising a second elastic part, disposed against and between the button portion and the bottom of the recess structure to urge the releasing part to move in the first direction until the retained portion is blocked at the through hole.

8. The adjustable supporting mechanism of claim 1, wherein the releasing part has a second passage, and the adjustment part is disposed movably in the second passage.

9. A projector, comprising:
   an apparatus casing comprising a plurality of fixed feet and having a bottom surface, the fixed feet being disposed on the bottom surface; and an adjustable supporting mechanism, installed in the apparatus casing, the adjustable supporting mechanism comprising:
- a clamping part fixedly disposed on the apparatus casing and having a first passage, the first passage extending in a first direction;
- an adjustment part disposed through the first passage and capable of extending and shrinking relative to the bottom surface of the apparatus casing;
- a constraining part comprising a constraint ring and a first elastic part, the constraint ring being sleeved on the clamping part, the first elastic part being disposed against the constraint ring to urge the constraint ring to move in the first direction, so that the clamping part clamps the adjustment part; and
- a releasing part capable of moving relative to the clamping part and pushing the constraint ring to urge the constraint ring to move in a second direction opposite to the first direction, so that the clamping part releases the adjustment part.

10. The projector of claim 9, wherein the adjustable supporting mechanism comprises a second elastic part, disposed against the releasing part to urge the releasing part to move in the first direction.

11. The projector of claim 9, wherein the clamping part comprises a pair of sidewalls, the sidewalls form the first passage, and the clamping part clamps the adjustment part by the sidewalls.

12. The projector of claim 11, wherein one of the sidewalls has a taper surface, and the constraint ring slides on the taper surface so that the clamping part is capable of clamping the adjustment part.

13. The projector of claim 12, wherein the apparatus casing has a top surface, opposite to the bottom surface, and the releasing part has a button portion, exposed out of the top surface.

14. The projector of claim 13, wherein the apparatus casing has a recess structure at the top surface and a through hole formed at a bottom of the recess structure, the releasing part is disposed in the recess structure and passes through the through hole, and the releasing part has a retained portion to prevent the releasing part from departing from the apparatus casing.

15. The projector of claim 14, wherein the adjustable supporting mechanism comprises a second elastic part, disposed against and between the button portion and the bottom of the recess structure to urge the releasing part to move in the first direction until the retained portion is blocked at the through hole.

16. The projector of claim 14, wherein the apparatus casing comprises an upper casing and a lower casing connected to the upper casing, the upper casing comprises the recess structure, and the clamping part is fixedly disposed on the lower casing.

17. The projector of claim 16, wherein the clamping part and the lower casing are formed in one piece.

18. The projector of claim 9, wherein the releasing part has a second passage, and the adjustment part is disposed movably in the second passage.

* * * * *